(12) United States Patent
Kim et al.

(10) Patent No.: US 8,590,016 B2
(45) Date of Patent: Nov. 19, 2013

(54) APPARATUS AND METHOD FOR REMOVING MALICIOUS CODE INSERTED INTO FILE

(75) Inventors: Won Ho Kim, Daejeon (KR); Jung Hwan Moon, Daejeon (KR); Ki Wook Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 804 days.

(21) Appl. No.: 12/106,571

(22) Filed: Apr. 21, 2008

(65) Prior Publication Data

US 2009/0150419 A1 Jun. 11, 2009

(30) Foreign Application Priority Data

Dec. 10, 2007 (KR) .................. 10-2007-0127633

(51) Int. Cl.
*H04L 29/06* (2006.01)
(52) U.S. Cl.
USPC .......... 726/4; 726/3; 726/22; 726/23; 726/24; 726/25; 726/26; 726/27; 726/28; 709/206; 709/246
(58) Field of Classification Search
USPC ................ 726/4, 3, 22–28; 709/206, 246
See application file for complete search history.

(56) References Cited

U.S. PATENT DOCUMENTS

| | | | |
|---|---|---|---|
| 7,080,407 B1* | 7/2006 | Zhao et al. ................. | 726/24 |
| 7,640,361 B1* | 12/2009 | Green et al. ................ | 709/246 |
| 2003/0105975 A1* | 6/2003 | Nagoya et al. .............. | 713/200 |
| 2005/0081059 A1* | 4/2005 | Bandini et al. .............. | 713/201 |
| 2006/0271597 A1* | 11/2006 | Boske ........................ | 707/200 |
| 2008/0209551 A1* | 8/2008 | Treacy et al. ............... | 726/22 |
| 2008/0313735 A1* | 12/2008 | Harrison et al. ............. | 726/23 |
| 2009/0113003 A1* | 4/2009 | Lu et al. .................... | 709/206 |
| 2009/0222922 A1* | 9/2009 | Sidiroglou et al. .......... | 726/23 |

FOREIGN PATENT DOCUMENTS

| | | |
|---|---|---|
| KR | 1020040051322 A | 6/2004 |
| KR | 1020060067117 | 6/2006 |

OTHER PUBLICATIONS

Li et al., "A Study of Malcde-Bearing Documents", pp. 1-20, DIMVA '07 Proceedings of te 4th international conference on Detection of Intrusions and Malware, and Vulnerability Assessment, Jul. 2007.*

* cited by examiner

*Primary Examiner* — Brandon Hoffman
*Assistant Examiner* — Hee Song
(74) *Attorney, Agent, or Firm* — Ladas & Parry LLP

(57) ABSTRACT

Provided are an apparatus and method for safely removing a malicious code from a file, or reporting the probable presence of a malicious code when it cannot be removed safely.

The method includes: determining whether a file is a document or image file; opening and saving the document file as a new file by using an application associated with the document file to remove a malicious code from the document file, when it is determined that the file is the document file; and converting the image file into a different file format from a present file format and saving the converted image file to remove a malicious code from the image file, when it is determined that the file is the image file.

8 Claims, 3 Drawing Sheets

APPARATUS AND METHOD FOR REMOVING MALICIOUS CODE INSERTED INTO FILE

CROSS-REFERENCE TO RELATED APPLICATION

This application claims priority to and the benefit of Korean Patent Application No. 2007-127633, filed Dec. 10, 2007, the disclosure of which is incorporated herein by reference in its entirety.

BACKGROUND

1. Field of the Invention

The present invention relates to detection and removal of a malicious code inserted into a file, and more particularly, to an apparatus and method for safely removing a malicious code from a document or image file, or reporting the probable presence of a malicious code inserted into it when the malicious code cannot be removed.

2. Discussion of Related Art

In recent times there have been various attempts to insert a malicious code into a document file by using vulnerabilities in word processors (e.g., Microsoft Office, Haansoft Hangul, etc.).

Conventionally, a malicious code inserted into a document file is detected by comparison of its signature with those of well-known malicious codes registered in a database (DB). In this case, a malicious code having no signature may be undetectable. Also, since recent malicious codes employ packers and polymorphism to avoid well-known signatures used for detection and vaccination, the conventional signature-based malicious code detection technology has become even more limited.

SUMMARY OF THE INVENTION

The present invention is directed to an apparatus and method for detecting and removing a non-signature based malicious code.

The present invention is also directed to an apparatus and method for safely removing a malicious code from a file, or reporting the probable presence of the malicious code when it cannot be safely removed.

The present invention is also directed to an apparatus and method for allowing a user to safely open an attached file of an e-mail by removing any malicious code inserted into the attached file.

One aspect of the present invention provides an apparatus for removing a malicious code, including: a file-type determining module for checking a type of a file; and an open and save-as module for opening and saving the file as a new file by using an application associated with the file to remove a malicious code inserted into the file when the file is a document file.

In one embodiment, the apparatus may further include an exception monitoring module for monitoring an operation of the open and save-as module to determine that there is an exception in case that the open and save-as module fails to open the file or save it as a new file; and a reporting module for reporting detection of a malicious code in the file to a user, when the exception monitoring module determines that there is an exception.

In another embodiment, the apparatus may further include a file deleting module for deleting the file when the exception monitoring module determines that there is an exception.

In still another embodiment, the apparatus may further include an image format converting module for opening and saving an image file as a new file after converting the file into a different file format to remove a malicious code inserted into the file, when the file is an image file.

Another aspect of the present invention provides a method for removing a malicious code, including: determining whether a file is a document or image file; opening and saving the document file as a new file by using an application associated with the document file to remove a malicious code from the document file, when it is determined that the file is the document file; and converting the image file into a different file format from a present file format and saving the converted image file to remove a malicious code from the image file, when it is determined that the file is the image file.

Still another aspect of the present invention provides an apparatus for removing a malicious code inserted into an attached file of an e-mail delivered by an email server, including: a malicious code removing module for removing a malicious code from the attached file by opening and saving the attached file as a new file, when the attached file is a document file, and by converting the attached file into a different file format, when the attached file is the image file; and a result sending module for sending, to the email server, the attached file from which the malicious code has been removed, when the malicious code removing module successfully works, and for reporting the probable presence of a malicious code in the attached file, when the malicious code removing module does not successfully works.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

For the sake of clarity and concision, detailed descriptions of certain disclosed functions or configurations that are associated with but not central to the present invention may be omitted.

Figure 1:
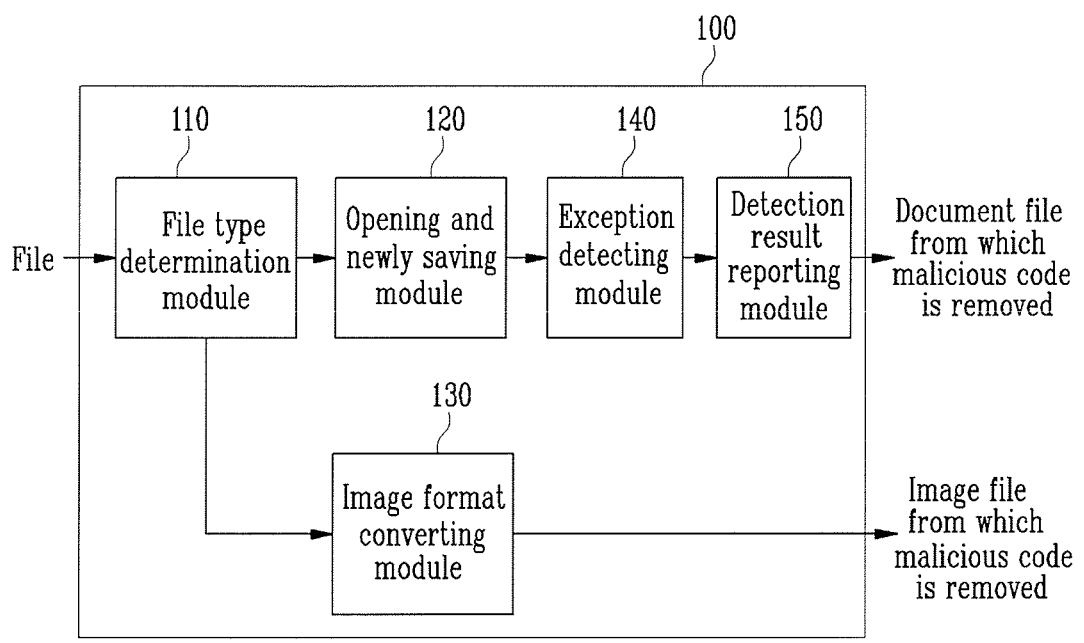
FIG. 1 is a schematic block diagram illustrating a configuration of an apparatus for removing a malicious code according to an exemplary embodiment of the present invention.

FIG. 1 is a schematic block diagram illustrating a configuration of an apparatus for removing a malicious code according to an exemplary embodiment of the present invention. Referring to FIG. 1, an apparatus 100 for removing a malicious code includes a file-type determination module 110, an open and save-as module 120, an image-format converting module 130, an exception-monitoring module 140, and a reporting module 150.

The file-type determination module 110 determines whether a file type is a document or an image, by checking a file extension. When the file is a document file, it will be processed by the open and save-as module 120, and when the file is an image file, it will be processed by the image-format converting module 130.

In one embodiment, document files can be Microsoft Office files (e.g., .doc, .ppt and .xls files), and Haansoft files (e.g., .hwp files), but the present invention is not limited thereto. Image files include .bmp, .jpg, .png files and so on.

The open and save-as module 120 opens the document file by using an application associated with the type of the document file. In one embodiment, the open and save-as module 120 opens the file using the most upgraded version of an application (e.g., MS Office or Haansoft word processor) employing the latest patch. The open and save-as module 120 then saves the opened file as a new file. When the file is saved as a new file, only a portion of the document file shown on a display is saved. Thus, any malicious code inserted into the file can be safely removed.

Meanwhile, the exception monitoring module 140 monitors operation of the open and save-as module 120 to check whether an exception such as failure of opening a file, which is often caused by a malicious code inserted into a document file, has been occurred. Since a malicious code only attacks specific operating systems or specific versions of applications, a system or program having a malicious code may have an error and be terminated in a non-specific environment. Further, an unknown malicious code may cause failure of a file to open properly.

When the reporting module 150 receives a notice of abnormal file open from the exception monitoring module 140, it reports that the file has a malicious code to the user.

Alternatively, the apparatus 100 for removing a malicious code may further include a file-deleting module (not illustrated) if the document file is not opened. When the file is deleted, the reporting module 150 may report the deletion of the file to the user.

The image-format converting module 130 converts the image file checked by the file-type determination module 110 into a different image file format from a present format and saves the converted image file. Thus, the malicious code affecting a specific image format may not be operated anymore.

In the aforementioned embodiments, the apparatus for removing a malicious code according to the present invention includes both the open and save-as module 120 for removing a malicious code inserted into a document file, and the image format converting module 130 for removing a malicious code inserted into an image file. However, it will be apparent to those skilled in the art that the present invention is not limited to these embodiments.

Figure 2:
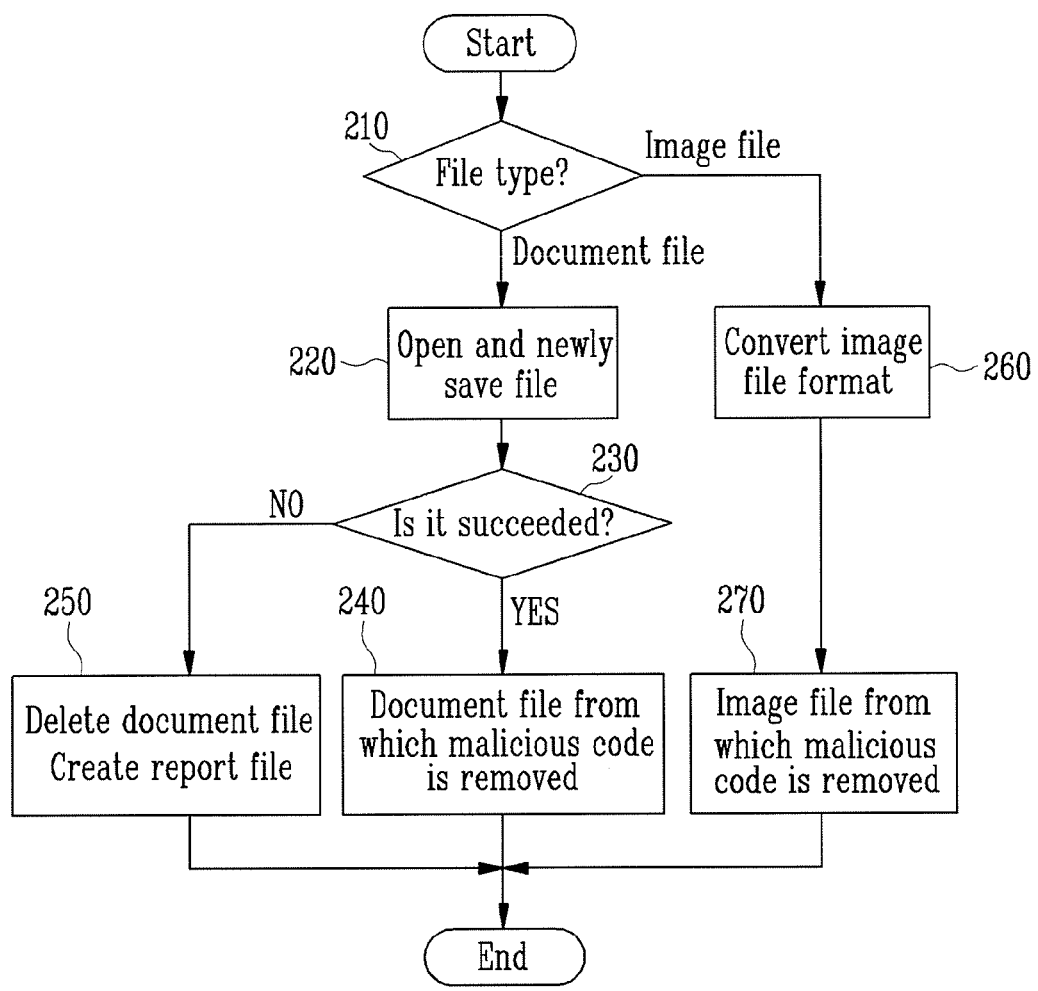
FIG. 2 is a flowchart illustrating a method for safely removing a malicious code inserted into a file according to an exemplary embodiment of the present invention.

FIG. 2 is a flowchart illustrating a method for safely removing a malicious code inserted into a file according to an exemplary embodiment of the present invention.

In step 210, a file type is checked to determine whether the file is a document or image file.

In step 220, when it is determined that the file is a document file, the document file is opened and saved as a new file using an application associated with the document file.

In step 230, it is determined whether the file is normally opened and saved as a new file in step 220. When the file open and save is normally performed, a document file from which any malicious code has been removed is obtained (step 240).

On the other hand, in step 230, when it is determined that the file open and newly save operation is not normally performed, a notice of the probable presence of a malicious code in the document file is provided. In an alternative embodiment, the document file may be deleted, and a report message for reporting the deletion may be provided in step 250.

In step 270, an image file is converted into a different file format from the present file format and the converted image file is saved.

In step 280, a new image file from which any malicious file has been removed is obtained.

Figure 3:
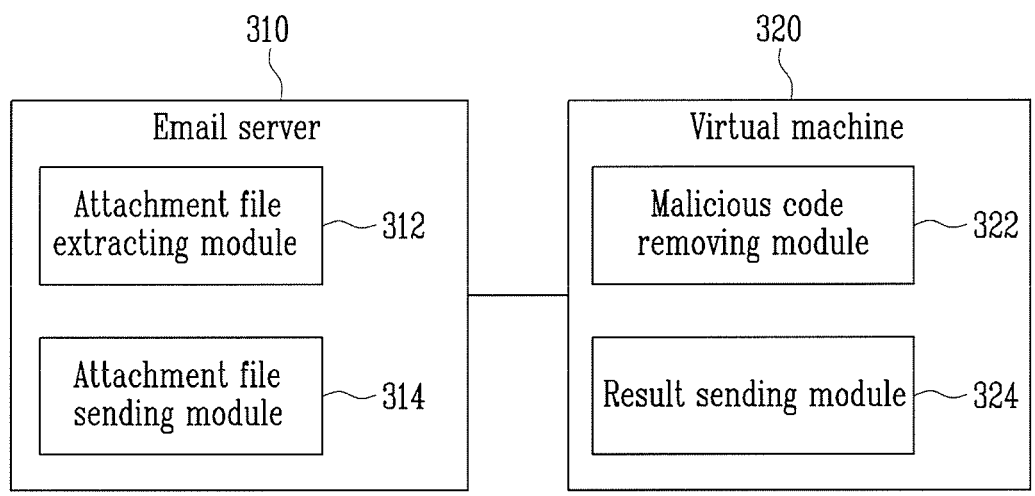
FIG. 3 is a block diagram of a system for removing a malicious code from an attached file delivered through an e-mail and sending an attached file from which a malicious code is removed to a user according to another exemplary embodiment of the present invention.

FIG. 3 is a block diagram of a system for removing a malicious code from an attached file received through an e-mail and sending the malicious code-removed file to a user according to another exemplary embodiment of the present invention.

An attached file extracting module 312 extracts an attached file from an e-mail delivered by an email server 310.

The attached file forwarding module 314 forwards the extracted attached file to a virtual machine 320.

The virtual machine 320 is an operating system operated in a virtual environment, to which the latest patch is applied, in the present invention. In the virtual machine, the latest versions of applications (e.g., MS Office and Haansoft programs) employing the latest patch are installed.

A malicious code removing module 322 embodied in the virtual machine 320 is a module corresponding to the apparatus for removing a malicious code according to the exemplary embodiment of the present invention illustrated in FIG. 1. When a file is a document file, any malicious code can be removed by performing open and save-as operation, and when the file is an image file, any malicious code can be removed by converting the image file to a different file format.

The result sending module 324 sends the malicious code-removed file to the email server 310, when the malicious code removing module 322 successfully works. On the other hand, when the module 332 does not successfully works, it sends a notice of the probable presence of a malicious code in the file.

According to the present invention, any malicious code can be removed from a document file by a file open and save-as operation using the latest version of an application employing the latest patch. And, any malicious code can be removed from an image file by image format conversion. Further, a user system can be protected by safely removing any malicious code inserted into an attached file of an e-mail and sending the file to a user by applying the present invention to an e-mail server. Moreover, the malicious code can be safely removed when a signature is not updated in a vaccine due to packing of the malicious code and application of polymorphism.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A computer apparatus for removing a malicious code, comprising:
   a microprocessor coupled to a memory having stored thereon:
   a file-type determining module for checking a type of a file;
   an open and save-as module for opening the file by using an application associated with the file and saving the opened file as a new file such that upon saving the opened file as the new file a malicious code inserted into the file is removed, when the file is a document file, wherein the application is the most upgraded version of the application employing the latest patch;
   an exception monitoring module for monitoring an operation of the open and save-as module and determining that there is an exception when the open and save-as module fails to open the file or save it as a new file; and a reporting module for reporting detection of a malicious code in the file to a user, when the exception monitoring module determines that there is an exception,
further comprising:
- an image format converting module for opening and saving an image file as a new file after converting the file into a different file format to remove a malicious code inserted into the file, when the file is an image file.

2. The apparatus according to claim 1, further comprising:
a file deleting module for deleting the file when the exception monitoring module determines that there is an exception.

3. A method for removing a malicious code, comprising:
determining whether a file is a document or image file;
opening the document file by using an application associated with the file and saving the opened document file as a new file such that upon saving the opened document file as the new file a malicious code inserted into the file is removed, wherein the application is the most upgraded version of the application employing the latest patch;
converting the image file into a different file format from a present file format and saving the converted image file to remove a malicious code from the image file, when it is determined that the file is the image file;
- determining whether the opening and saving of the document file is normally performed; and
- reporting the probable presence of a malicious code in the document file, when it is determined that the opening and saving of the document file is not normally performed.

4. The method according to claim 3, further comprising:
deleting the document file and reporting the deletion of it, when it is determined that the opening and saving of the document file is not normally performed.

5. A computer apparatus for removing a malicious code which is inserted into an attached file of an e-mail delivered by an email server, the apparatus comprising:

a microprocessor coupled to a memory having stored thereon:

a malicious code removing module for removing a malicious code from the attached fife by opening the attached file by using an application associated with the file and saving the attached file as a new file such that upon saving the attached file as the new file a malicious code inserted into the file is removed, wherein the application is the most upgraded version of the application employing the latest patch, when the attached file is a document file, and by converting the attached file into a different file format, when the attached file is the image file; and a result sending module for sending, to the email server, the attached file from which the malicious code has been removed, when the malicious code removing module successfully works, and for reporting the probable presence of a malicious code in the attached file, when the malicious code removing module does not successfully works.

6. The apparatus according to claim 5, wherein both the malicious code removing module and the result sending module are operated in a virtual machine in which the latest version of the application employing the latest patch is installed.

7. The apparatus according to claim 5, wherein the email server comprises an attached file extracting module for extracting the attached file from the e-mail; and
an attached file forwarding module for forwarding the extracted attached file to the malicious code removing module.

8. The apparatus according to claim 5, wherein the malicious code removing file deletes the document file and reports the deletion of it, when it is determined that the opening and saving of the document file is not normally performed.

\* \* \* \* \*